United States Patent [19]
McTiffin

[11] Patent Number: 5,406,550
[45] Date of Patent: Apr. 11, 1995

[54] COMMUNICATION SYSTEMS
[75] Inventor: Michael J. McTiffin, Winchester, England
[73] Assignee: Roke Manor Research Limited, Romsey, England
[21] Appl. No.: 136,259
[22] Filed: Oct. 15, 1993
[30] Foreign Application Priority Data
  Mar. 17, 1993 [GB] United Kingdom ............... 9305443
[51] Int. Cl.⁶ .......................................... H04J 13/000
[52] U.S. Cl. ..................................... 370/18; 370/60.1
[58] Field of Search ...................... 370/18, 95.1, 95.3, 370/94.1, 94.2, 60, 61.1; 375/1; 379/59, 60, 54; 455/33.1, 33.2, 33.3

[56] References Cited
U.S. PATENT DOCUMENTS
5,168,498 12/1992 Adams et al. ...................... 370/95.1

Primary Examiner—Douglas W. Olms
Assistant Examiner—Ajit Patel
Attorney, Agent, or Firm—Hill, Steadman & Simpson

[57] ABSTRACT

A communication system for transmission of data from an ATM network to a mobile radio system having an interface apparatus coupled therebetween which is operative to remove from the header of each ATM cell entering the system from the network VPI and VCI data. A translator, responsive to the VPI and VCI data, appropriately codes data formed of the remainder of each cell from which the VPI and VCI data has been removed so that it will be received by a mobile user having an address as indicated by the VPI and CPI data. A second translator responsive to codes corresponding to user addresses produces corresponding VPI and VCI data. A unit for recombining the VPI and VCI data with data formed of the remainder of the cell from which it was removed is provided to thereby produce whole cells suitable for transmission from the system to a mobile terminal.

5 Claims, 3 Drawing Sheets

COMMUNICATION SYSTEMS

BACKGROUND OF THE INVENTION

This invention relates to communication systems and more especially it relates to mobile radio communication systems of the kind wherein an Asynchronous Transfer Mode (ATM) network is used to support a mobile radio communication system.

The principles of ATM operation are well known to those skilled in the art and are described in our copending British patent application 9213373.5, to which attention is hereby directed.

In ATM systems, data is transmitted over a network in small packets or cells, which each consist of 48 octets of user significant data (known as the information field) and 5 octets of network significant data (known as the header). The term user significant data when used herein is intended to include any type of information passing over the network and includes speech and/or signalling. The header of an ATM cell contains a number of fields as follows. Two fields comprise the Virtual Path Identifier (VPI) and Virtual Channel Identifier (VCI) which are used to route cells across the ATM network. Thus, the combination of the VPI and the VCI fields define at each interface connection identity. Another field comprises Header Error Control data (HEC) which is used to detect and correct errors in the header. A further field contains Generic Flow Control data (GFC) which is used to control user access and is not used within the network. Further fields comprise the Payload Type Indicator data (PTI) and Cell Loss Priority data (CLP) which have significance for transmission of data across an ATM network.

It will be appreciated that in order to pass ATM cells from an ATM fixed network to a mobile terminal over a radio network, provision must be made for transmission of at least some of the header data as well as the information field. One method of transporting ATM cells across a radio interface between an ATM fixed network and a mobile cellular radio terminal is to transport the full 53 octet cell. However, as will be appreciated, this imposes a large burden of header information on the mobile radio system, hereinafter called an overhead. This total overhead occupies about 10% of the available bandwidth which might more productively be used to enable more mobile users to be accommodated by the system.

SUMMARY OF THE INVENTION

Accordingly, it is an object of the present invention to provide a communication system including an interface between an ATM fixed network and a mobile radio system wherein the overhead is reduced.

According to one aspect of the present invention, a communication system for transmission of data from an ATM network to a mobile radio system (i.e., a 'down link') comprises interface apparatus coupled therebetween which is operative to remove from the header of each ATM cell entering the said system from the said network, VPI and VCI address data, translator means responsive to the VPI and VCI address data for applying an appropriate transmission code to the data comprising the remainder of each cell from which the said VPI and VCI address data has been removed so that it will be received by a mobile terminal having an address as indicated by the VPI and VCI address data, and further comprising second translator means responsive to transmission codes for producing corresponding VPI and VCI address data, and means for recombining this VPI and VCI address data with data comprising the remainder of the ATM cell from which it was removed, thereby to produce whole ATM cells suitable for transmission to the mobile terminal.

It will be appreciated that for the transmission of data in the opposite direction (i.e., in the 'up link'), a similar process will occur.

The mobile radio system may be arranged to use a Code Division Multiple Access (CDMA) technique, and in this case the transmission code used will correspond to an appropriate CDMA code.

Alternatively, the mobile radio system may be arranged to use a Time Division Multiple Access (TDMA) technique, and in this case the transmission code used will correspond to an appropriate TDMA time slot.

In order still further to reduce the overhead, other fields may be removed from the header and used to provide a basis for adaptation of the remainder of the cell before it is transmitted into the mobile radio system, a suitable reconstitution process being effected to re-introduce the fields, so that the ATM cells are sufficiently reconstituted before being re-introduced into the ATM system.

For example, the HEC and GFC header fields may be removed from each cell together with the VPI and VCI fields thereby to produce an information field and truncated header which is transmitted across the mobile radio system using a code as indicated by the VPI/VCI data, the fields being reconstituted to produce a complete cell with the appropriate header information before being re-transmitted through the ATM system.

Embodiments of the invention will now be described by way of example only with reference to the accompanying drawings.

DESCRIPTION OF THE PREFERRED EMBODIMENTS

Figure 1:
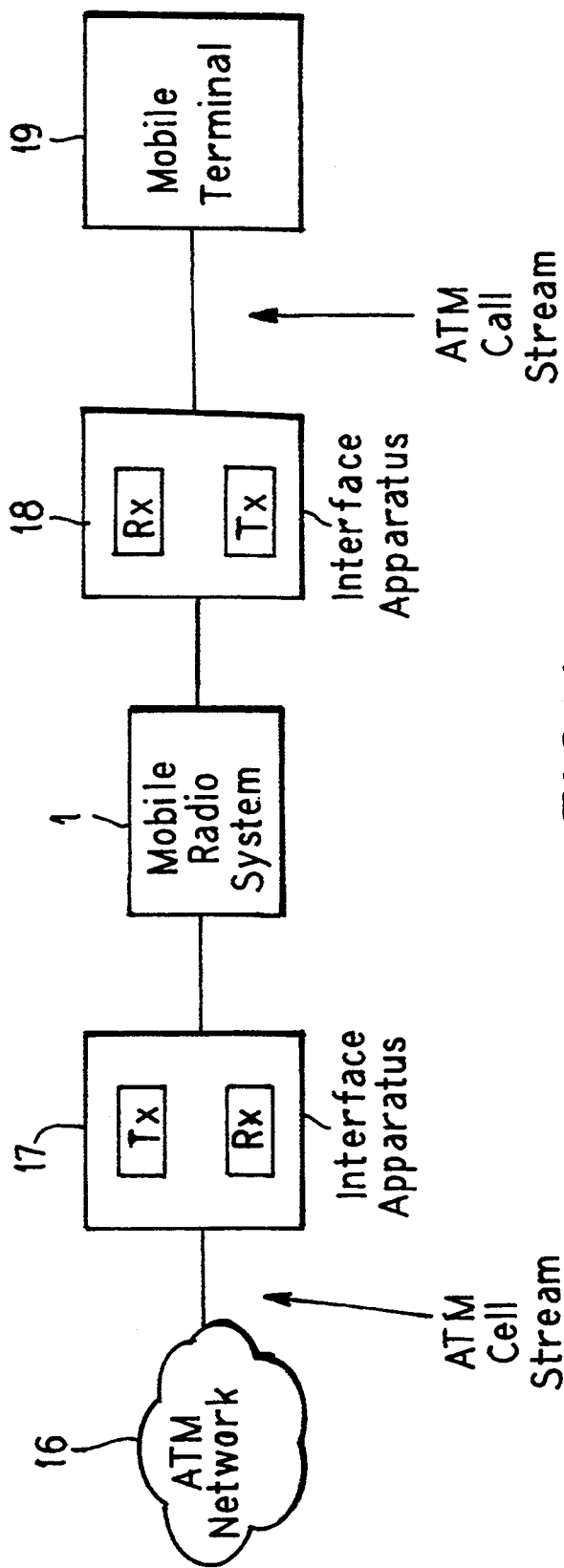
FIG. 1 shows an ATM network connected to a mobile terminal by way of interface apparatus positioned at each end of a mobile radio system.

As shown in the schematic block diagram of a communication system in FIG. 1, an ATM network 16 is connected to an interface apparatus 17 which is in turn connected to an input of a mobile radio system 1. The output of the mobile radio system 1 connects through an interface apparatus 18 to a mobile terminal 19.

Figure 2:
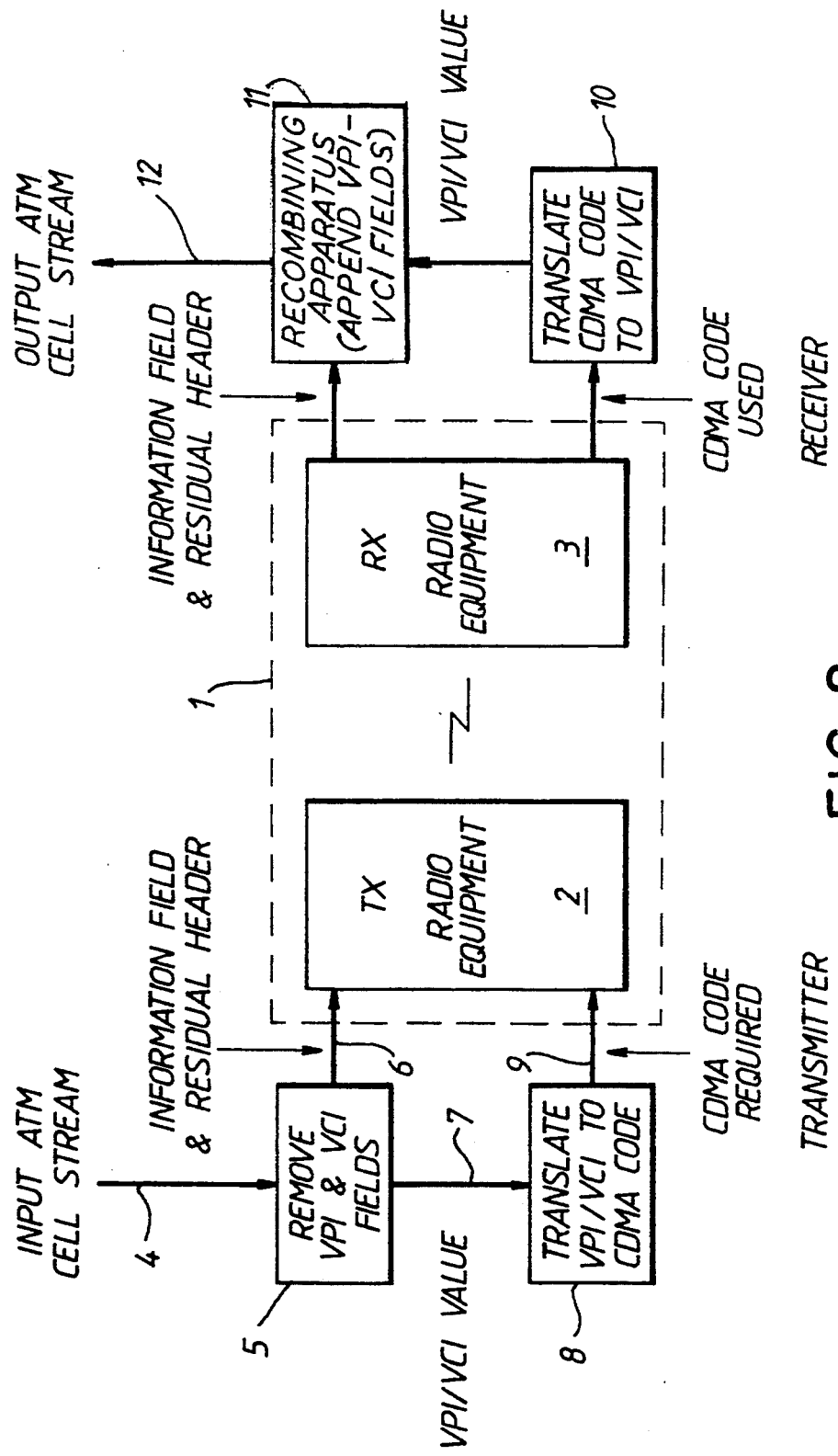
FIG. 2 is a schematic block diagram of a communication system according to one embodiment of the invention.

Referring now to FIG. 2, the communication system comprises a mobile radio system shown within a broken line 1, which comprises a transmitter 2 which is in communication with a plurality of mobile units and a receiver 3 which is in communication with a plurality of transmitters not shown. Cells from the ATM network are fed via a line 4 to a unit 5 which serves to remove the VPI and VCI data fields from the header. The information field and residual header of each cell are then fed via a line 6 to the radio transmitter equipment 2. The VPI and VCI field data is fed from the unit 5 via a line 7 to a translator 8 which serves to translate the VPI and VCI field data to corresponding CDMA code data which is fed via a line 9 to the transmitter equipment 2.

The remainder of each cell comprising the information field and the residual header, from which the VPI and VCI data has been removed, are transmitted to an address appropriate to a mobile as indicated by the VPI and VCI data.

Conversely, signals received within the mobile radio system at the receiving equipment 3 are translated in a second translator 10 to produce VPI and VCI codes corresponding to the CDMA code used in the system. This VPI and VCI data is then combined in a unit 11 with the remainder of the appropriate cell so that it can be retransmitted via a line 12 to the mobile terminal.

Thus, it will be appreciated that a significant reduction in overhead is achieved by mapping the ATM header connection information (VPI+VCI) onto the CDMA code used for the radio path. In operation, at the time of connection establishment, or when a mobile affiliates to a new cell or when a mobile is to transfer a block of data, the fixed part of the network, typically the base station, allocates the CDMA code to be used for that connection or data transfer within a particular radio cell. Subsequently, all ATM cells transmitted on the connection are carried on the specified CDMA code. If more than one connection is required between a particular mobile and base station, a separate CDMA code is allocated for each additional connection.

In operation of the system hereinbefore described with reference to FIG. 2, each cell of the ATM cell stream on the line 4 consists of 48 octet information field plus a 5 octet header and conforms to the relevant CCITT standards. The VPI and VCI fields are removed from the header and the residual header plus information field are forwarded to the radio equipment. At the same time, the VPI and VCI values are translated into the value of the CDMA code to be used over the radio interface, and this code value is also sent to the radio equipment. The radio equipment then uses the required code for transmitting the ATM cell information field residual header over the radio paths as hereinbefore described with reference to the drawing. At the receiver the reverse process applies, the value of the CDMA code used for the transmission is translated into the corresponding VPI/VCI combination, this is then appended to the information received over the radio interface to reconstitute the original ATM cell.

Further overhead savings may be achieved by making use of the error detection and correction capabilities of a digital radio system. These generally provide a more powerful error control facility than can be given by the HEC. Thus, the HEC field is not necessary over the radio interface and can be removed. In addition, since the GFC is only significant on the user interface with suitable terminal equipment, it is not necessary to transmit it over the radio interface. It is therefore only essential to transmit PTI and CLP fields over the radio path.

Figure 3:
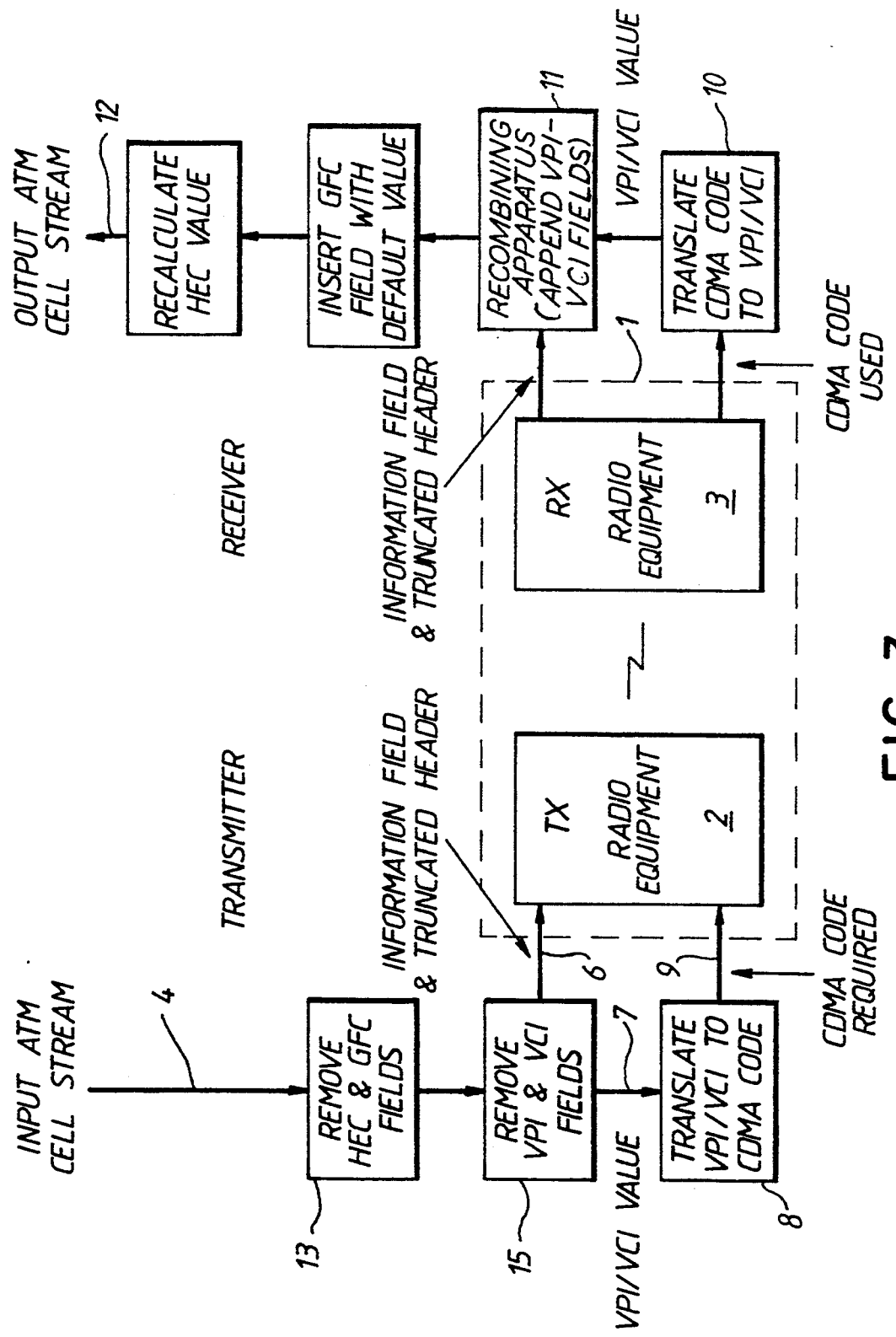
FIG. 3 is a schematic block diagram of a communication system according to an alternative embodiment of the invention.

Referring now to FIG. 3, an improved communication system will now be described, wherein parts corresponding to FIG. 2 bear the same numerical designations. In general, an ATM cell stream will contain empty filler cells and it is assumed that these are removed in advance of the processes performed in the arrangement which will hereinafter be described with reference to FIG. 3. For each nonempty cell, however, the following operations are performed. At the transmitter 2 the HEC and GFC fields are removed in a unit 13 and the VPI and VCI fields are translated to provide a CDMA code which is used for the transmission of the remainder of the cell, i.e., the information field and a truncated header.

At the receiver 3 the VPI and VCI portion of the header is reconstructed by unit 14, the GFC field is given a default value and the HEC field is re-calculated before the output stream is reconstituted. The ATM cells of the output stream are arranged to conform to the appropriate CCITT standards. It will be appreciated by those skilled in the art that empty cells will be appropriately reinserted to ensure that there is a continuous stream of cells on the output interface.

Although the invention has been illustrated with reference to a CDMA radio access technique, it will be understood that it is generally applicable to other radio access techniques, such as for example, Time Division Multiple Access (TDMA). Using TDMA, once the time slot (or plurality of time slots) to be used for a particular connection or data transfer has been allocated, a similar mapping to that described with reference to FIGS. 2 and 3 above can be performed. However, instead of a mapping to CDMA codes, the mapping is to appropriate time slots.

It will be appreciated that an important advantage of systems according to the present invention is that there is a significant reduction in the amount of data that must be transmitted over a radio interface with each ATM cell. The use of VPI/VCI to CDMA code mapping will reduce the overhead from about 10% to about 5%. The introduction of further savings may be applied to further reduce the overhead to about 1%. These improvements will add significantly to the efficiency of the operation of the radio system and facilitate the inclusion of more mobile users.

Although various minor changes and modifications might be suggested by those skilled in the art, it will be apparent that I wish to include within the scope of the patent warranted hereon all such changes and modifications as reasonably come within my contribution to the art.

I claim as my invention:

1. A communication system for transmission of data from an ATM network to a mobile radio system, comprising:

interface apparatus coupled between the ATM network and mobile radio system which is operative to remove from a header of each ATM cell entering the system from the network VPI and VCI address data;

first translator means responsive to the VPI and VCI address data for applying an appropriate transmission code to data comprising a remainder of each cell from which the VPI and VCI address data has been removed so that it will be received by a mobile terminal having an address as indicated by the VPI and VCI address data;

second translator means responsive to transmission codes for producing corresponding VPI and VCI address data; and means for recombining the VPI and VCI address data with data comprising the remainder of the ATM cell from which it was removed to thereby produce whole ATM cells suitable for transmission to said mobile terminal.

2. A system according to claim 1 wherein the mobile radio system is arranged to use a Code Division Multiple Access (CDMA) technique such that the transmission code corresponds to an appropriate CDMA code.

3. A system according to claim 1 wherein the mobile radio system is arranged to use a Time Division Multiple Access (TDMA) technique such that the transmission code used corresponds to an appropriate TDMA time slot.

4. A system according to claim 1 wherein other header fields are removed from the header before it is transmitted into the mobile radio system, a suitable reconstitution process being effected to re-introduce the other header fields so that the ATM cells are sufficiently reconstituted before being reintroduced into the ATM network.

5. A system according to claim 4 wherein HEC and GFC header fields are removed from the ATM cell together with VPI and VCI address data to thereby produce an information field and truncated header which is transmitted across the mobile radio system using a code as indicated by the VPI/VCI address data, the fields being reconstituted to produce a complete cell with appropriate header information before being re-transmitted through the ATM network.

* * * * *